(12) United States Patent (10) Patent No.: US 8,588,282 B2
Konishi (45) Date of Patent: Nov. 19, 2013

(54) TRANSMITTING/RECEIVING DEVICE AND SIGNAL TRANSMITTING APPARATUS

(75) Inventor: Yasuaki Konishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 243 days.

(21) Appl. No.: 13/235,055

(22) Filed: Sep. 16, 2011

(65) Prior Publication Data

US 2012/0177087 A1    Jul. 12, 2012

(30) Foreign Application Priority Data

Jan. 6, 2011    (JP) .................................. 2011-001117

(51) Int. Cl.
*H04B 1/38*    (2006.01)
*H04B 3/00*    (2006.01)

(52) U.S. Cl.
USPC .......................................... 375/219; 375/257

(58) Field of Classification Search
USPC ................................................ 375/219, 257
See application file for complete search history.

(56) References Cited

U.S. PATENT DOCUMENTS

| | | | |
|---|---|---|---|
| 2003/0017807 A1* | 1/2003 | Boman et al. | 455/73 |
| 2008/0175260 A1* | 7/2008 | Hussain et al. | 370/419 |
| 2011/0085617 A1* | 4/2011 | Davis et al. | 375/295 |

FOREIGN PATENT DOCUMENTS

| | | |
|---|---|---|
| JP | 06-085713 A | 3/1994 |
| JP | 2003-022717 A | 1/2003 |
| JP | 2005-051750 A | 2/2005 |

* cited by examiner

*Primary Examiner* — Don N Vo
(74) *Attorney, Agent, or Firm* — Sughrue Mion, PLLC (57) ABSTRACT

A transmitting/receiving device includes a transmitting/receiving unit and a signal processing unit. The transmitting/receiving unit is connected to a transmission side or a reception side via a differential signal line including a pair of signal lines, receives a signal using one of the pair of signal lines when being connected to the transmission side, and transmits a signal using the other of the pair of signal lines when being connected to the reception side. The signal processing unit processes a signal that is transmitted or received by the transmitting/receiving unit.

8 Claims, 6 Drawing Sheets

TRANSMITTING/RECEIVING DEVICE AND SIGNAL TRANSMITTING APPARATUS

CROSS-REFERENCE TO RELATED APPLICATIONS

This application is based on and claims priority under 35 USC 119 from Japanese Patent Application No. 2011-001117 filed Jan. 6, 2011.

BACKGROUND (i) Technical Field

The present invention relates to a transmitting/receiving device and a signal transmitting apparatus.

(ii) Related Art

Hitherto, a communication cable such as a cable of so-called RS-232C is used for connecting a computer to a peripheral device such as a scanner. Such communication cables are classified into straight cables in which connector pins of the same pin numbers of connectors are connected to each other, and cross cables in which connector pins of different pin numbers are connected to each other. Any of these two types of cables is used in accordance with the application and specifications of devices.

SUMMARY

According to an aspect of the invention, there is provided a transmitting/receiving device including a transmitting/receiving unit and a signal processing unit. The transmitting/receiving unit is connected to a transmission side or a reception side via a differential signal line including a pair of signal lines, receives a signal using one of the pair of signal lines when being connected to the transmission side, and transmits a signal using the other of the pair of signal lines when being connected to the reception side. The signal processing unit processes a signal that is transmitted or received by the transmitting/receiving unit.

BRIEF DESCRIPTION OF THE DRAWINGS

Exemplary embodiment(s) of the present invention will be described in detail based on the following figures, wherein.

DETAILED DESCRIPTION

First Exemplary Embodiment

A first exemplary embodiment of the present invention will be described with reference to FIGS. 1 and 2.

Figure 1:
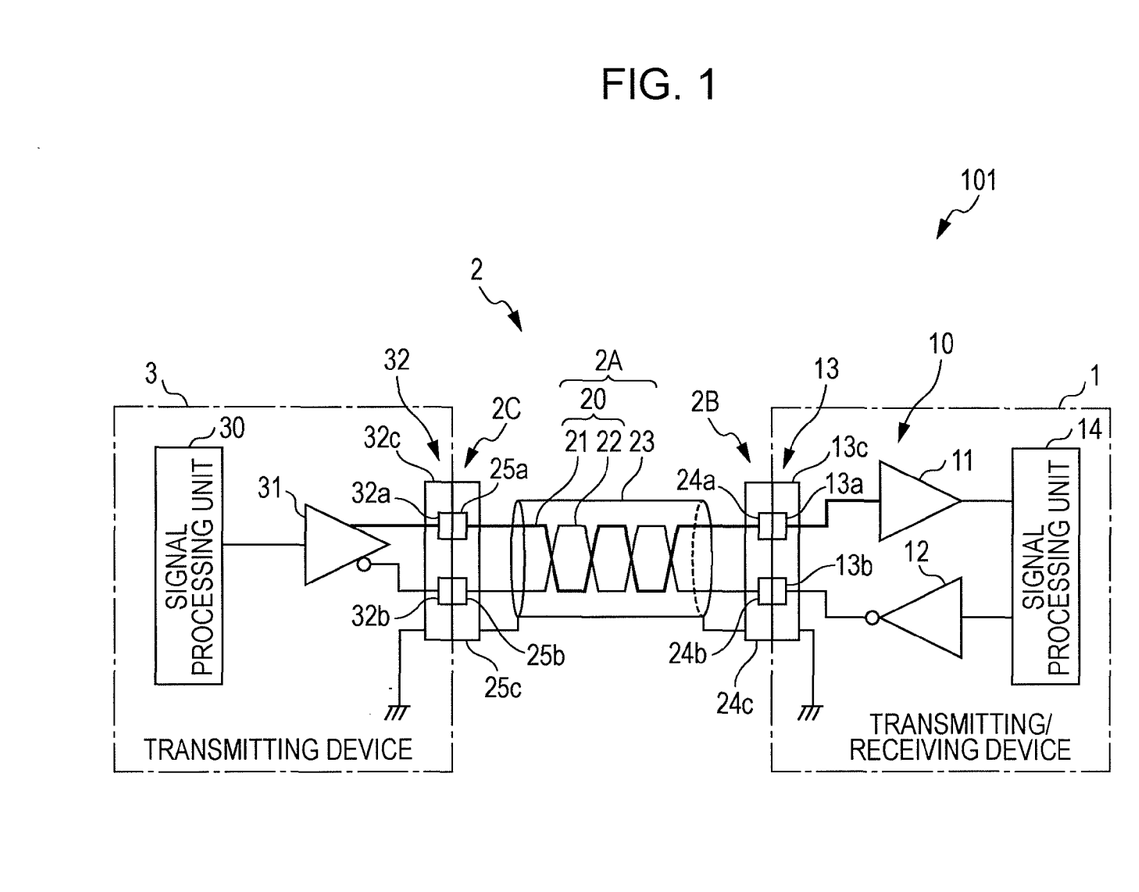
FIG. 1 is a schematic diagram illustrating an example configuration in a case where a transmitting device is connected to a transmitting/receiving device according to a first exemplary embodiment of the present invention.

FIG. 1 is a schematic diagram illustrating an example configuration of a signal transmitting apparatus 101 in a case where a transmitting device 3 is connected to a transmitting/receiving device 1 according to the first exemplary embodiment.

Figure 2:
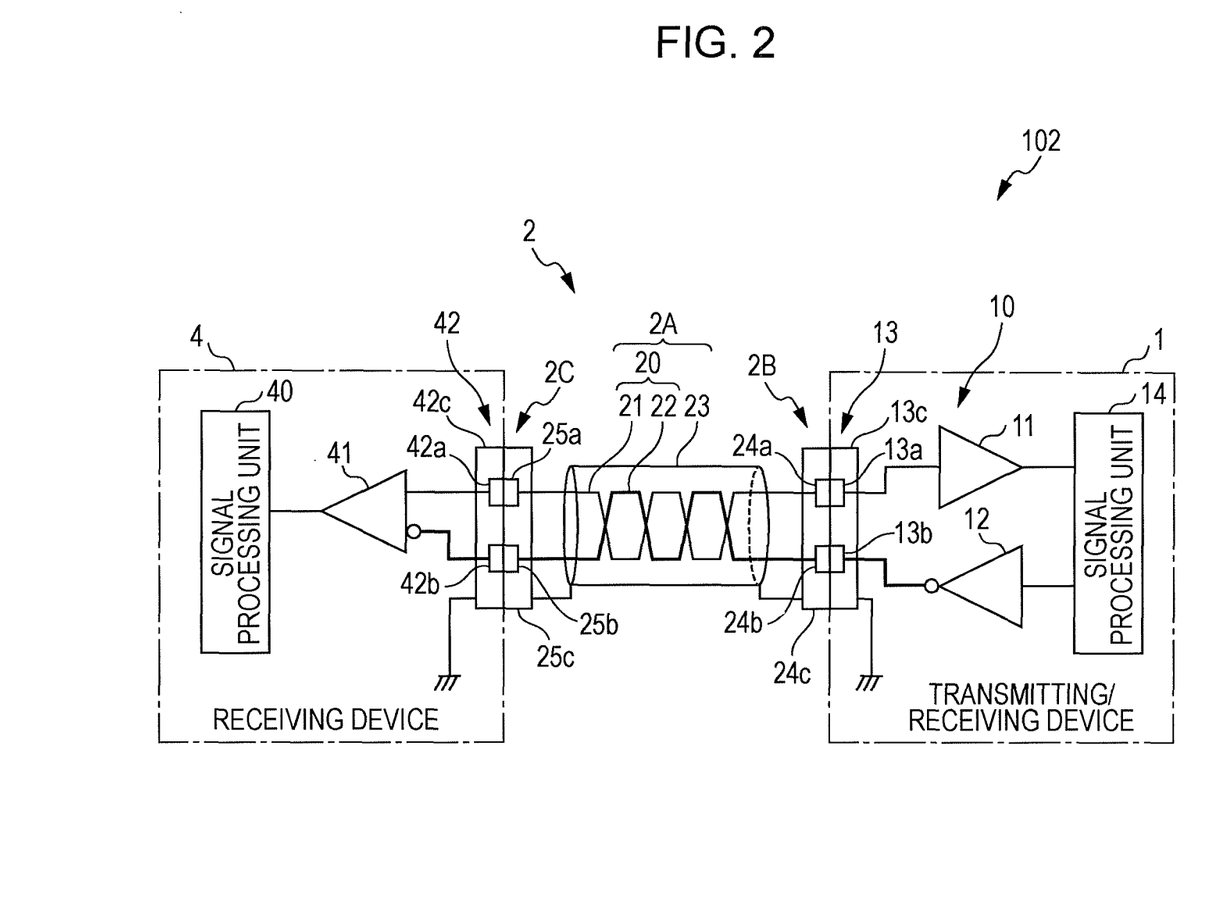
FIG. 2 is a schematic diagram illustrating an example configuration in a case where a receiving device is connected to the transmitting/receiving device according to the first exemplary embodiment of the present invention.

FIG. 2 is a schematic diagram illustrating an example configuration of a signal transmitting apparatus 102 in a case where a receiving device 4 is connected to the transmitting/receiving device 1 according to the first exemplary embodiment.

Configuration of Transmitting/Receiving Device

The transmitting device 3 (illustrated in FIG. 1) or the receiving device 4 (illustrated in FIG. 2) is connected to the transmitting/receiving device 1 via a communication cable 2. When the transmitting device 3 is connected, the transmitting/receiving device 1 constitutes, together with the transmitting device 3, the signal transmitting apparatus 101 in which a signal is received from the transmitting device 3. When the receiving device 4 is connected, the transmitting/receiving device 1 constitutes, together with the receiving device 4, the signal transmitting apparatus 102 in which a signal is transmitted to the receiving device 4. The transmitting device 3 is an example of a transmission side, and the receiving device 4 is an example of a reception side.

The transmitting/receiving device 1 includes a transmitting/receiving unit 10 that includes a reception amplifier (receiver) 11 and a transmission amplifier (transmitter) 12, a connector unit 13 to which the communication cable 2 is detachably connected, and a signal processing unit 14 that processes a signal received by the transmitting/receiving unit 10 from the transmitting device 3 or a signal that is to be transmitted to the receiving device 4.

The connector unit 13 is provided with a first terminal 13a connected to the input side of the reception amplifier 11, a second terminal 13b connected to the output side of the transmission amplifier 12, and a conductive shell 13c provided to surround the first and second terminals 13a and 13b. The shell 13c is connected to the reference potential (0 V) of the transmitting/receiving device 1.

The reception amplifier 11 outputs an ON signal (1) to the signal processing unit 14 when the potential of a signal input thereto via the first terminal 13a is equal to or higher than a threshold that is predetermined with respect to the reference potential, and outputs an OFF signal (0) to the signal processing unit 14 when the potential of the signal is lower than the threshold.

The transmission amplifier 12 amplifies an ON signal (1) or OFF signal (0) input thereto from the signal processing unit 14 and outputs the signal via the second terminal 13b.

The signal processing unit 14 is constituted by a hardware device such as an application specific integrated circuit (ASIC), a central processing unit (CPU) that operates in accordance with a program stored in advance, or the like, and processes a signal received by the reception amplifier 11 from the transmitting device 3 or a signal to be transmitted by the transmission amplifier 12 to the receiving device 4. The signal processing unit 14 temporarily stores information about a signal received by, for example, the reception amplifier 11 from the transmitting device 3, and transfers the information to another device, or receives, from another device, information that is to be transferred to the receiving device 4, temporarily stores the information, and outputs the information one bit by one bit to the transmission amplifier 12.

Configuration of Communication Cable

The communication cable 2 includes a body unit 2A, a first connector unit 2B, and a second connector unit 2C.

The body unit 2A includes a differential signal line 20 and a shield line 23 that is composed of a conductive woven line or metallic foil and that shields the differential signal line 20. The differential signal line 20 and the shield line 23 are covered with a sheath made of an insulating resin (not illustrated). The differential signal line 20 includes a pair of a first signal line 21 and a second signal line 22, which serve as twisted pair lines.

The first connector unit 2B is provided at one end portion of the body unit 2A, and includes a conductive shell 24c, and a first terminal 24a and a second terminal 24b provided inside the shell 24c. The second connector unit 2C is provided at the other end portion of the body unit 2A, and includes a conductive shell 25c, and a third terminal 25a and a fourth terminal 25b provided inside the shell 25c.

The first terminal 24a is connected to one end portion of the first signal line 21, and the third terminal 25a is connected to the other end portion thereof. The second terminal 24b is connected to one end portion of the second signal line 22, and the fourth terminal 25b is connected to the other end portion thereof. One end portion of the shield line 23 is connected to the shell 24c, and the other end portion thereof is connected to the shell 25c.

Configuration of Transmitting Device

The transmitting device 3 includes a signal processing unit 30, a differential amplifier (differential transceiver) 31 that amplifies a signal input from the signal processing unit 30 and outputs differential signals, and a connector unit 32 to which the communication cable 2 is detachably connected.

The signal processing unit 30 is constituted by a hardware device such as an ASIC, a CPU that operates in accordance with a program stored in advance, or the like, and executes processing of generating a signal that is to be transmitted to the transmitting/receiving device 1 by the differential amplifier 31.

The differential amplifier 31 outputs a first output signal and a second output signal generated through differential amplification performed on a signal input from the signal processing unit 30. The first output signal and the second output signal are signals of opposite signs in which the polarities are reversed with respect to each other. When an ON signal (1) is input from the signal processing unit 30, the potential of the first output signal is higher than the potential of the second output signal. When an OFF signal (0) is input from the signal processing unit 30, the potential of the first output signal is lower than the potential of the second output signal.

The connector unit 32 is provided with a first terminal 32a that is connected to the output side of the differential amplifier 31 and that transmits the first output signal, a second terminal 32b that transmits the second output signal, and a conductive shell 32c provided to surround the first and second terminals 32a and 32b. The shell 32c is connected to the reference potential of the transmitting device 3.

Configuration of Receiving Device

The receiving device 4 includes a differential receiver 41, a signal processing unit 40 that processes a signal received by the differential receiver 41, and a connector unit 42 to which the communication cable 2 is detachably connected.

The connector 42 is provided with a first terminal 42a and a second terminal 42b connected to the input side of the differential receiver 41, and a conductive shell 42c provided to surround the first and second terminals 42a and 42b. The shell 42c is connected to the reference potential of the receiving device 4.

The input side of the differential receiver 41 is connected to the first terminal 42a and the second terminal 42b. A signal output from the differential receiver 41 varies depending on which of the potential of the first terminal 42a and the potential of the second terminal 42b is higher. More specifically, the differential receiver 41 outputs an ON signal (1) when the potential of the first terminal 42a is higher than the potential of the second terminal 42b, and outputs an OFF signal (0) when the potential of the second terminal 42b is higher than the potential of the first terminal 42a. A terminating resistor (not illustrated) is connected to the signal lines extending between the differential receiver 41 and the first and second terminals 42a and 42b.

Operation of Transmitting/Receiving Device when Transmitting Device is Connected When the transmitting device 3 is connected to the transmitting/receiving device 1, as illustrated in FIG. 1, the first terminal 32a of the connector unit 32 of the transmitting device 3 and the first terminal 13a of the connector unit 13 of the transmitting/receiving device 1 are electrically connected to each other via the third terminal 25a, the first signal line 21, and the first terminal 24a of the communication cable 2. Also, the second terminal 32b of the connector unit 32 of the transmitting device 3 and the second terminal 13b of the connector unit 13 of the transmitting/receiving device 1 are electrically connected to each other via the fourth terminal 25b, the second signal line 22, and the second terminal 24b of the communication cable 2.

The referential potential of the transmitting device 3 and the referential potential of the transmitting/receiving device 1 are electrically connected to the shield line 23 of the communication cable 2, and thus the reference potentials of the transmitting device 3 and the transmitting/receiving device 1 are the same.

When the signal processing unit 30 outputs a signal to the differential amplifier 31, the differential amplifier 31 performs differential amplification on the signal, thereby outputting a first output signal and a second output signal. The first output signal is transmitted to the transmitting/receiving device 1 via the first signal line 21 of the differential signal line 20. The second output signal is transmitted to the transmitting/receiving device 1 via the second signal line 22 of the differential signal line 20.

The first output signal transmitted to the transmitting/receiving device 1 via the first signal line 21 is input to the reception amplifier 11. The reception amplifier 11 outputs an ON signal (1) when the potential of the input signal is equal to or higher than a threshold predetermined with respect to the reference potential, and outputs an OFF signal (0) when the potential of the input signal is lower than the threshold. That is, the transmitting/receiving device 1 receives a signal transmitted from the transmitting device 3 using so-called single-end transmission.

On the other hand, the second output signal from the differential amplifier 31 of the transmitting device 3 is not input to the reception amplifier 11, but is transmitted to the output side of the transmission amplifier 12 that is in a high-impedance state. Thus, the second output signal does not affect the communication performed between the transmitting device 3 and the transmitting/receiving device 1.

The signal processing unit 14 receives a signal output from the reception amplifier 11, the signal being based on the first output signal from the differential amplifier 31 of the transmitting device 3, and executes predetermined processing on the received signal.

Operation of Transmitting/Receiving Device when Receiving Device is Connected

When the receiving device 4 is connected to the transmitting/receiving device 1, as illustrated in FIG. 2, the first terminal 42a of the connector unit 42 of the receiving device 4 and the first terminal 13a of the connector unit 13 of the transmitting/receiving device 1 are electrically connected to each other via the third terminal 25a, the first signal line 21, and the first terminal 24a of the communication cable 2. Also, the second terminal 42b of the connector unit 42 of the receiving device 4 and the second terminal 13b of the connector unit 13 of the transmitting/receiving device 1 are electrically connected to each other via the fourth terminal 25b, the second signal line 22, and the second terminal 24b of the communication cable 2.

The reference potential of the receiving device 4 and the reference potential of the transmitting/receiving device 1 are electrically connected to the shield line 23 of the communication cable 2, and thus the reference potentials of the receiving device 4 and the transmitting/receiving device 1 are the same.

When the signal processing unit 14 of the transmitting/receiving device 1 outputs a signal to the transmission amplifier 12, the transmission amplifier 12 amplifies the signal and outputs the signal via the second terminal 13b. The signal output from the transmission amplifier 12 is transmitted to the receiving device 4 via the second signal line 22 of the differential signal line 20. On the other hand, the output of the transmission amplifier 12 is not transmitted to the first signal line 21 of the differential signal line 20.

The signal transmitted via the second signal line 22 is transmitted from the second terminal 42b of the receiving device 4 to one of the input terminals of the differential receiver 41. The differential receiver 41 outputs an ON signal (1) or an OFF signal (0) to the signal processing unit 40 on the basis of the signal transmitted to the input terminal. Since the signal from the transmitting/receiving device 1 is not transmitted to the other input terminal of the differential receiver 41 connected to the first terminal 42a, a signal of a potential determined depending on terminating resistance is input thereto. This potential is set to a potential between the potential in a case where the transmission amplifier 12 of the transmitting/receiving device 1 outputs an ON signal and the potential in a case where the transmission amplifier 12 outputs an OFF signal on the input side of the differential receiver 41. That is, the receiving device 4 receives a signal that is transmitted from the transmitting/receiving device 1 through so-called single-end transmission.

The signal processing unit 40 of the receiving device 4 receives the signal output from the differential receiver 41, and executes predetermined processing on the signal.

Operation of First Exemplary Embodiment

As described above, the transmitting/receiving device 1 receives a signal from a transmission side using the reception amplifier 11 connected to one of the pair of signal lines 21 and 22 constituting the differential signal line 20, and transmits a signal to a reception side using the transmission amplifier 12 connected to the other signal line. According to the first exemplary embodiment, the transmitting/receiving device 1 may perform communication without a user's operation of switching between transmission and reception in both cases where the transmitting device 3 is connected to the transmitting/receiving device 1 and where the receiving device 4 is connected to the transmitting/receiving device 1.

In the first exemplary embodiment, transmission or reception is performed through single-end transmission using one of the pair of signal lines of the differential signal line. Thus, a cable length is restricted compared to the case of differential transmission, in which both the pair of signal lines of the differential signal line are used. However, communication may be performed without a problem using a cable length that enables single-end transmission. For example, according to the standard of small computer system interface (SCSI) based on single-end transmission, the cable length is specified to be six meters or less. When the length of the communication cable 2 is within this range, communication may be performed.

Second Exemplary Embodiment

Next, a second exemplary embodiment of the present invention will be described with reference to FIGS. 3 to 6. A signal transmitting apparatus 100 according to the second exemplary embodiment includes a transmitting/receiving device 5, a receiving/transmitting device 6 that communicates with the transmitting/receiving device 5, and a communication cable 7 that connects the transmitting/receiving device 5 and the receiving/transmitting device 6. The signal transmitting apparatus 100 is used to, for example, transfer image information about three different color components of a document image read by an image reading apparatus.

First Example of Entire Configuration of Signal Transmitting Apparatus

Figure 3:
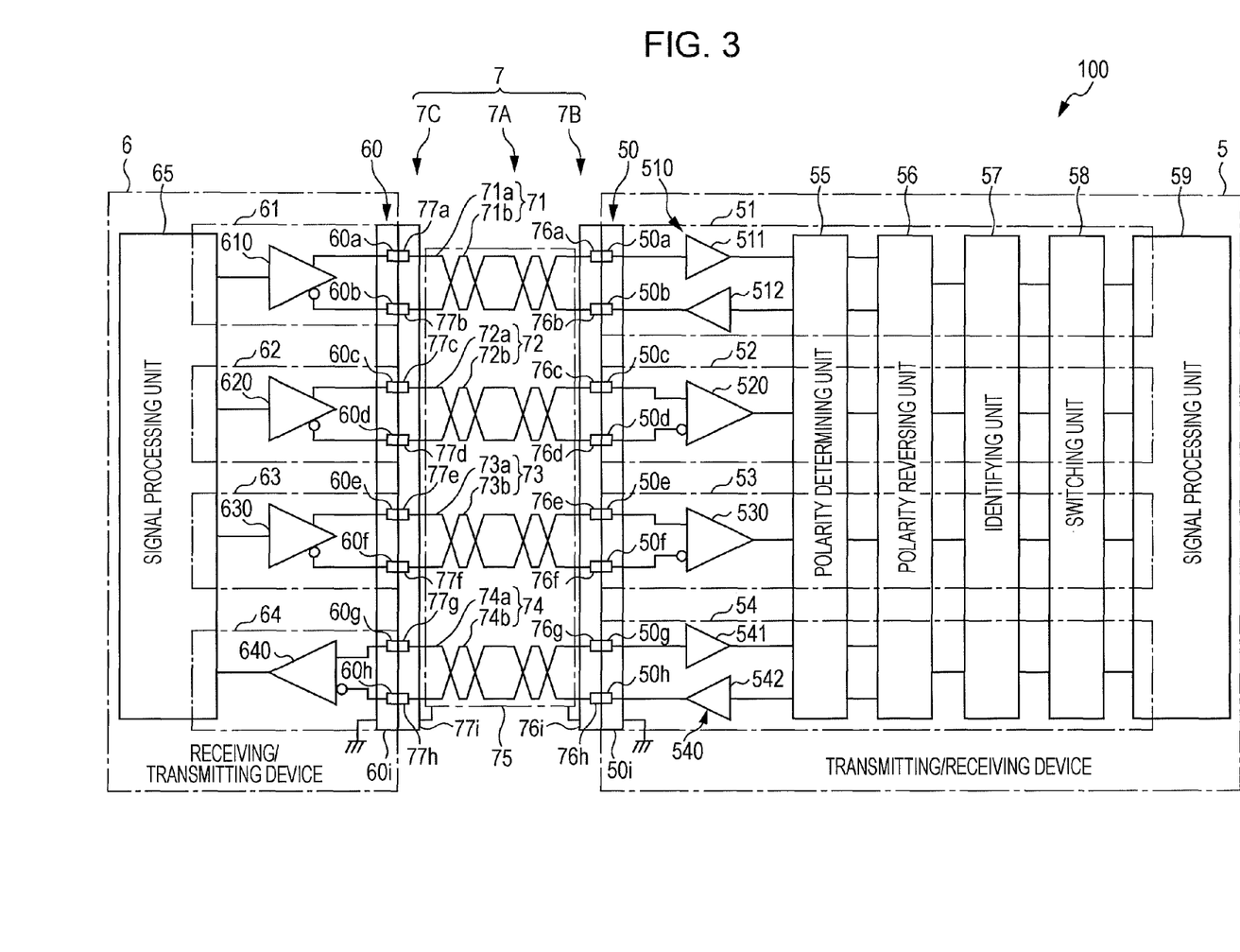
FIG. 3 is a schematic diagram illustrating an example configuration of a signal transmitting apparatus in a case where a transmitting/receiving device according to a second exemplary embodiment of the present invention is connected to a receiving/transmitting device via a straight cable.

FIG. 3 is a diagram illustrating an example configuration of the signal transmitting apparatus 100 including the transmitting/receiving device 5, the receiving/transmitting device 6 that communicates with the transmitting/receiving device 5, and the communication cable 7 that connects the transmitting/receiving device 5 and the receiving/transmitting device 6 according to the second exemplary embodiment. The communication cable 7 is a straight cable, and connects a first terminal 50a of a connector unit 50 of the transmitting/receiving device 5 and a first terminal 60a of a connector unit 60 of the receiving/transmitting device 6. Also, the communication cable 7 connects second to eighth terminals 50b to 50h of the connector unit 50 and second to eighth terminals 60b to 60h of the connector unit 60, respectively.

Configuration of Receiving/Transmitting Device

The receiving/transmitting device 6 includes first to fourth ports 61 to 64 and is configured to perform communication in parallel using these ports. In the second exemplary embodiment, the first to third ports 61 to 63 serve as transmission ports for transmitting signals processed by a signal processing unit 65 to the transmitting/receiving device 5, and the fourth port 64 serves as a reception port for outputting signals received from the transmitting/receiving device 5 to the signal processing unit 65. The first to third ports 61 to 63 correspond to an example of the transmission side. The forth port 64 corresponds to an example of the reception side.

The first port 61 includes a first differential amplifier 610, performs differential amplification on a signal input from the signal processing unit 65 to the first differential amplifier 610, and transmits signals from the first terminal 60a and the second terminal 60b of the connector unit 60. The second port 62 includes a second differential amplifier 620, performs differential amplification on a signal input from the signal processing unit 65 to the second differential amplifier 620, and transmits signals from the third terminal 60c and the fourth terminal 60d of the connector unit 60. The third port 63 includes a third differential amplifier 630, performs differential amplification on a signal input from the signal processing unit 65 to the third differential amplifier 630, and transmits signals from the fifth terminal 60e and the sixth terminal 60f of the connector unit 60.

The fourth port 64 includes a differential receiver 640 that receives signals from the seventh terminal 60g and the eighth terminal 60h of the connector unit 60, and outputs an ON signal (1) or an OFF signal (0) to the signal processing unit 65 on the basis of which of the potentials of the two input signals is higher. A terminating resistor (not illustrated) is connected to signal lines extending between the differential receiver 640 and the seventh and eight terminals 60g and 60h.

A conductive shell 60i of the connector unit 60 is connected to the reference potential of the receiving/transmitting device 6.

Configuration of Communication Cable

The communication cable 7 includes a body unit 7A and first and second connector units 7B and 7C. The body unit 7A includes first to fourth differential signal lines 71 to 74, and a shield line 75 that is composed of a conductive woven line or metallic foil and that shields the first to fourth differential signal lines 71 to 74. The first to fourth differential signal lines 71 to 74 and the shield line 75 are covered with a sheath made of an insulating resin (not illustrated). The first differential signal line 71 includes a pair of a first signal line 71a and a second signal line 71b, which are twisted pair lines. Also, the second to fourth differential signal lines 72 to 74 include pairs of first signal lines 72a to 74a and second signal lines 72b to 74b, respectively, which are twisted pair lines.

The first connector unit 7B is provided at one end portion of the body unit 7A, and includes a conductive shell 76i, and first to eighth terminals 76a to 76h provided inside the shell 76i. The second connector unit 7C is provided at the other end portion of the body unit 7A, and includes a conductive shell 77i, and first to eighth terminals 77a to 77h provided inside the shell 77i. The shell 76i and the shell 77i are electrically connected to the shield line 75. Accordingly, the reference potentials of the transmitting/receiving device 5 and the receiving/transmitting device 6 are the same.

The first differential signal line 71 includes a first signal line 71a, which connects the first terminal 76a of the first connector unit 7B and the first terminal 77a of the second connector unit 7C, and a second signal line 71b, which connects the second terminal 76b of the first connector unit 7B and the second terminal 77b of the second connector unit 7C. The second to fourth differential signal lines 72 to 74 are configured similarly, and thus corresponding reference numerals are attached thereto and the description thereof is omitted.

Second Example of Entire Configuration of Signal Transmitting Apparatus

Figure 4:
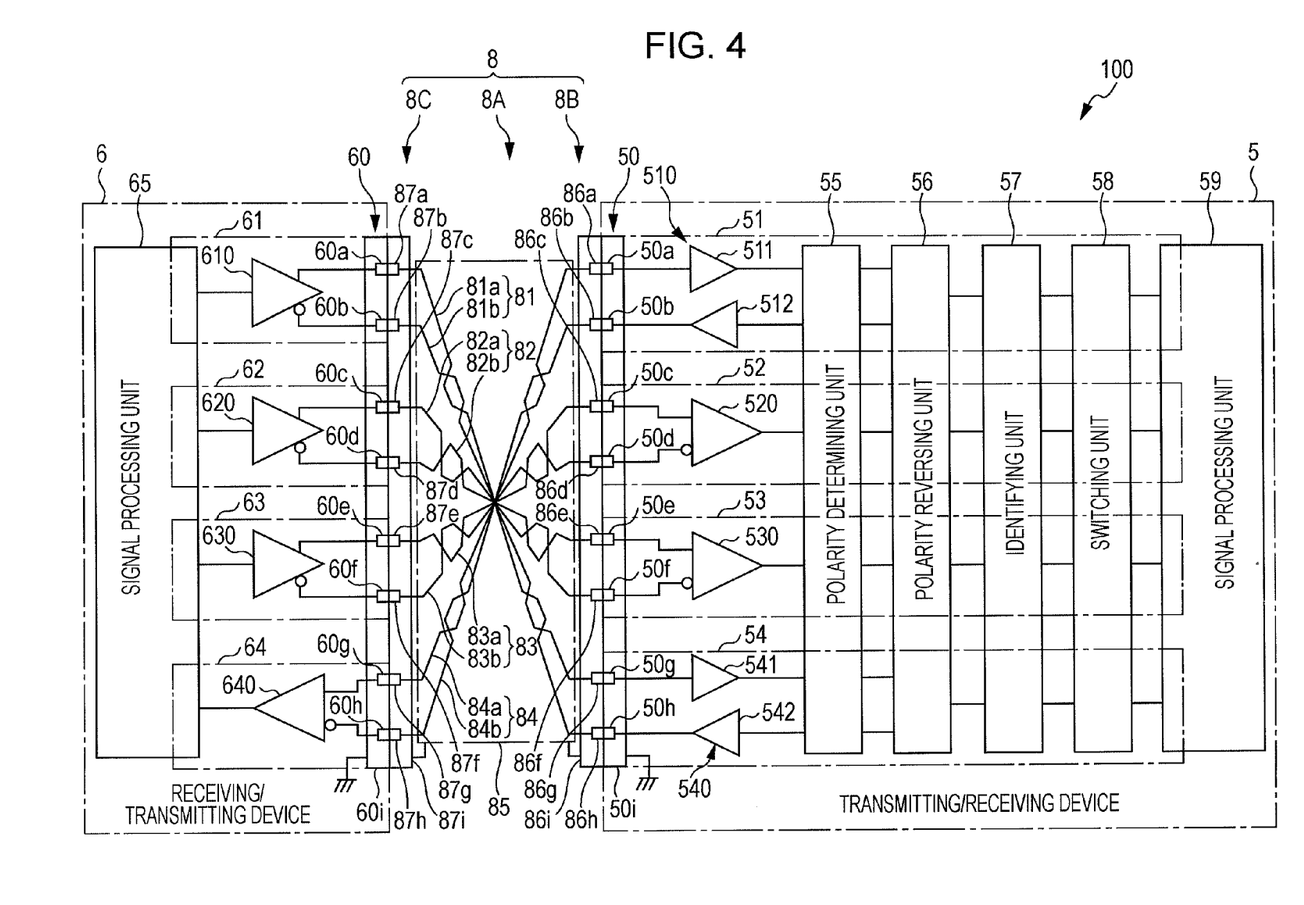
FIG. 4 is a schematic diagram illustrating an example configuration of the signal transmitting apparatus in a case where the transmitting/receiving device according to the second exemplary embodiment of the present invention is connected to the receiving/transmitting device via a cross cable.

FIG. 4 is a diagram illustrating an example configuration of the signal transmitting apparatus 100 in a case where the transmitting/receiving device 5 and the receiving/transmitting device 6 are connected to each other via a communication cable 8. The communication cable 8 is a cross cable, and connects the first terminal 50a of the connector unit 50 of the transmitting/receiving device 5 and the eighth terminal 60h of the connector unit 60 of the receiving/transmitting device 6. Also, the communication cable 8 connects the second to eighth terminals 50b to 50h of the connector unit 50 and the seventh to first terminals 60g to 60a of the connector unit 60, respectively.

Configuration of Communication Cable

The communication cable 8 includes a body unit 8A and first and second connector units 8B and 8C. The body unit 8A includes first to fourth differential signal lines 81 to 84, and a shield line 85 that is composed of a conductive woven line or metallic foil and that shields the first to fourth differential signal lines 81 to 84. The first to fourth differential signal lines 81 to 84 and the shield line 85 are covered with a sheath made of an insulating resin (not illustrated).

The first connector unit 8B is provided at one end portion of the body unit 8A, and includes a conductive shell 86i and first to eighth terminals 86a to 86h provided inside the shell 86i. The second connector unit 8C is provided at the other end portion of the body unit 8A, and includes a conductive shell 87i and first to eighth terminals 87a to 87h provided inside the shell 87i. The shell 86i and the shell 87i are electrically connected to the shield line 85.

The first differential signal line 81 includes a first signal line 81a, which connects the first terminal 87a of the second connector unit 8C and the eighth terminal 86h of the first connector unit 8B, and a second signal line 81b, which connects the second terminal 87b of the second connector unit 8C and the seventh terminal 86g of the first connector unit 8B. The second differential signal line 82 includes a first signal line 82a, which connects the third terminal 87c of the second connector unit 8C and the sixth terminal 86f of the first connector unit 8B, and a second signal line 82b, which connects the fourth terminal 87d of the second connector unit 8C and the fifth terminal 86e of the first connector unit 8B.

The third differential signal line 83 includes a first signal line 83a, which connects the fifth terminal 87e of the second connector unit 8C and the fourth terminal 86d of the first connector unit 8B, and a second signal line 83b, which connects the sixth terminal 87f of the second connector unit 8C and the third terminal 86c of the first connector unit 8B. The fourth differential signal line 84 includes a first signal line 84a, which connects the seventh terminal 87g of the second connector unit 8C and the second terminal 86b of the first connector unit 8B, and a second signal line 84b, which connects the eighth terminal 87h of the second connector unit 8C and the first terminal 86a of the first connector unit 8B.

The signal transmitting apparatus 100 according to the second exemplary embodiment is configured so that the transmitting/receiving device 5 and the receiving/transmitting device 6 may bidirectionally communicate with each other in both cases where these devices are connected to each other via the communication cable 7 serving as a straight cable and where these devices are connected to each other via the communication cable 8 serving as a cross cable, due to the characteristic configuration of the transmitting/receiving device 5. The lengths of the communication cable 7 and the communication cable 8 are desirably six meters or less for the above-described reason, as in the communication cable 2 according to the first exemplary embodiment.

Configuration of Transmitting/Receiving Device

The transmitting/receiving device 5 includes first to fourth ports 51 to 54, and is configured to perform communication in parallel using these ports. In the second exemplary embodiment, the first port 51 and the fourth port 54 serve as transmission/reception ports for performing transmission and reception, and the second port 52 and the third port 53 serve as reception ports for performing reception.

The first port 51 includes a first transmitting/receiving unit 510 including a first reception amplifier 511 and a first transmission amplifier 512. The input side of the first reception amplifier 511 is connected to the first terminal 50a of the connector unit 50. Also, the output side of the first transmission amplifier 512 is connected to the second terminal 50b of the connector unit 50.

The second port 52 includes a first differential receiver 520. The input side of the first differential receiver 520 is connected to the third terminal 50c and the fourth terminal 50d of the connector unit 50.

The third port 53 includes a second differential receiver 530. The input side of the second differential receiver 530 is connected to the fifth terminal 50e and the sixth terminal 50f of the connector unit 50.

The fourth port 54 includes a second transmitting/receiving unit 540 including a second reception amplifier 541 and a second transmission amplifier 542. The input side of the second reception amplifier 541 is connected to the seventh terminal 50g of the connector unit 50. The output side of the second transmission amplifier 542 is connected to the eighth terminal 50h of the connector unit 50.

The connector unit 50 is provided with a conductive shell 50i, which surrounds the first to eighth terminals 50a to 50h. The shell 50i is connected to the reference potential of the transmitting/receiving device 5.

Also, the transmitting/receiving device 5 includes a polarity determining unit 55, a polarity reversing unit 56, an identifying unit 57, a switching unit 58, and a signal processing unit 59.

The polarity determining unit 55 determines, on the basis of a signal received from the receiving/transmitting device 6 at the time of initialization of the transmitting/receiving device 5, whether the signal has a reversed polarity or a positive polarity.

When the determination result generated by the polarity determining unit 55 is "positive polarity", the polarity reversing unit 56 outputs the signal received from the receiving/transmitting device 6 to the identifying unit 57 in the subsequent stage without reversing the polarity of the signal. When the determination result generated by the polarity determining unit 55 is "reversed polarity", the polarity reversing unit 56 reverses the polarity of a signal received thereafter from the receiving/transmitting device 6 and outputs the signal to the identifying unit 57.

Figure 5:
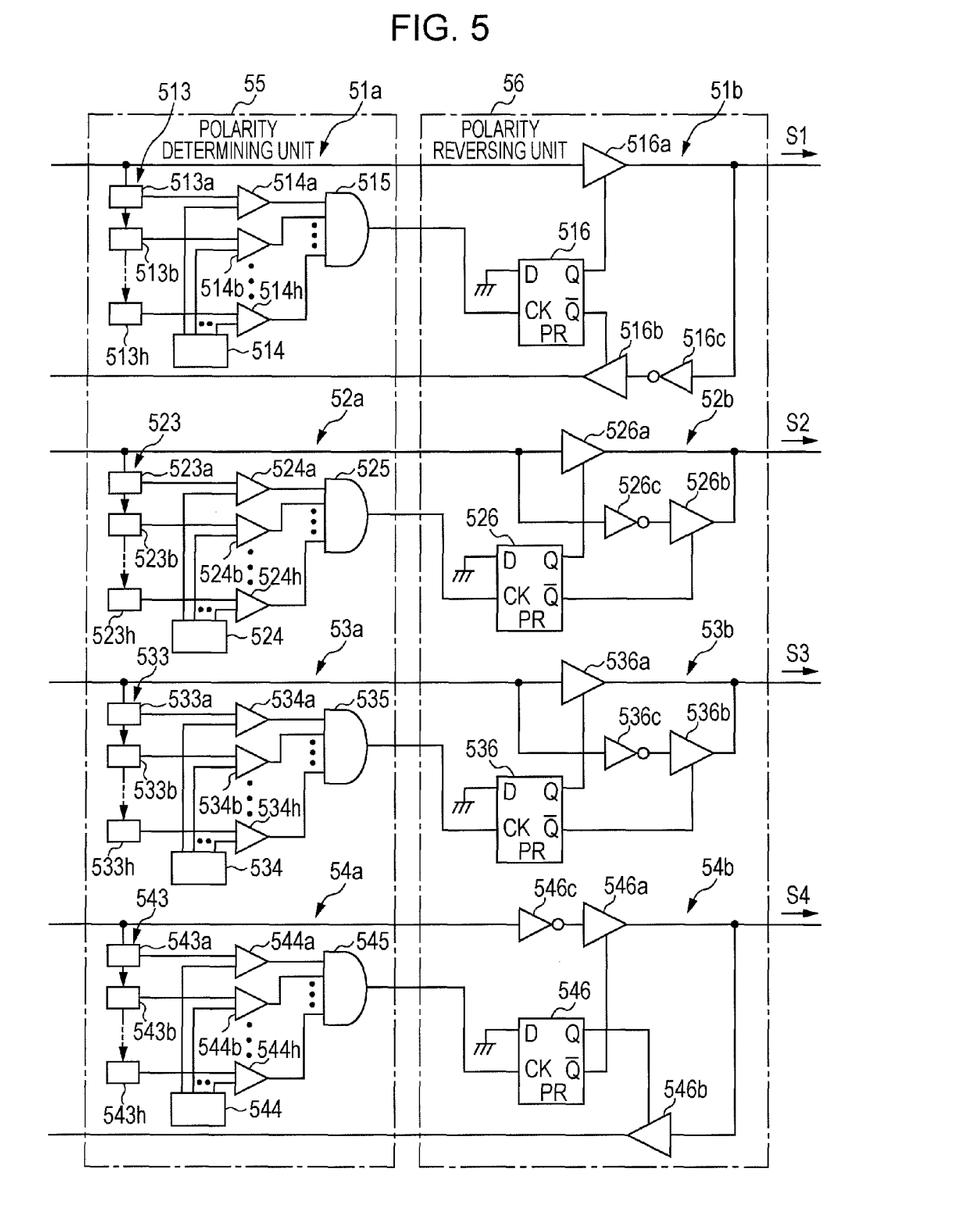
FIG. 5 is a schematic circuit diagram illustrating a specific example of configurations of a polarity determining unit and a polarity reversing unit according to the second exemplary embodiment of the present invention.

FIG. 5 is a schematic circuit diagram illustrating a specific example of configurations of the polarity determining unit 55 and the polarity reversing unit 56.

The polarity determining unit 55 includes determining circuits 51a to 54a, which correspond to the first to fourth ports 51 to 54, for determining the polarities of respective received signals. The configurations of the determining circuits of the respective ports are the same. Thus, a description will be given of the determining circuit 51a in the first port 51, and the description of the determining circuits 52a to 54a in the second to fourth ports 52 to 54 is omitted by attaching corresponding reference numerals thereto. In the second exemplary embodiment, the first and second reception amplifiers 511 and 541, the first and second transmission amplifiers 512 and 542, and so forth are configured so that the polarities of signals are not reversed when the transmitting/receiving device 5 and the receiving/transmitting device 6 are connected to each other via the communication cable 7 (straight cable), and that the polarities of signals are reversed when the transmitting/receiving device 5 and the receiving/transmitting device 6 are connected to each other via the communication cable 8 (cross cable).

The determining circuit 51a determines the polarity of a received signal on the basis of data having a predetermined bit length (for example, eight bits) received from the receiving/transmitting device 6 at the time of initialization of the transmitting/receiving device 5. Information representing ON (1) or OFF (0) of the signal received from the receiving/transmitting device 6 is stored in a shift register 513 that sequentially stores such signals. The content of individual registers 513a to 513h of the shift register 513 is compared one bit by one bit with the content stored in advance in a memory 514 by comparators 514a to 514h. The AND of the comparison results thereof (1: match, 0: mismatch) is calculated by an AND gate 515. The memory 514 stores in advance data that is obtained when a signal received from the receiving/transmitting device 6 has a reversed polarity.

The AND gate 515 outputs an ON signal to the polarity reversing unit 56 when the data received from the receiving/transmitting device 6 matches the data stored in the memory 514, and outputs an OFF signal to the polarity reversing unit 56 when the pieces of data do not match. That is, the AND gate 515 outputs an ON signal when the data received from the receiving/transmitting device 6 has a reversed polarity, and does not output an ON signal when the data has a positive polarity. The signal output from the AND gate 515 represents a determination result generated by the determining circuit 51a.

The polarity reversing unit 56 includes reversing circuits 51b to 54b for reversing the polarity of a signal received from the receiving/transmitting device 6 and a signal to be transmitted to the receiving/transmitting device 6 when the signal received from the receiving/transmitting device 6 has a reversed polarity on the basis of the determination results (output signals of the AND gates 515 to 545) supplied from the determining circuits 51a to 54a of the polarity determining unit 55.

The reversing circuits 51b to 54b include D flip-flop circuits (hereinafter referred to as "FF circuits") 516 to 546, respectively, having clock (CK) terminals that receive outputs of the determining circuits 51a to 54a. Data (D) terminals of the respective FF circuits 516 to 546 are connected to the reference potential. Also, pulse signals are input to preset (PR) terminals of the respective FF circuits 516 to 546 from a pulse signal output circuit (not illustrated) after the power has been turned on. The pulse signals cause Q outputs to be preset to ON and cause ⁻Q outputs to be preset to OFF.

In a case where the transmitting/receiving device 5 and the receiving/transmitting device 6 are connected to each other via the communication cable 7 (straight cable), the polarity of a signal received from the receiving/transmitting device 6 is not reversed, and thus the Q outputs remain ON and the ⁻Q outputs remain OFF. On the other hand, in a case where the transmitting/receiving device 5 and the receiving/transmitting device 6 are connected to each other via the communication cable 8 (cross cable), the polarity of a signal received from the receiving/transmitting device 6 is reversed, and thus the Q outputs become OFF and the ⁻Q outputs become ON due to the signals output from the AND gates 515 to 545.

The reversing circuit 51b in the first port 51 includes three-state buffers 516a and 516b, and an inverter 516c provided in the preceding stage of the three-state buffer 516b. The Q output of the FF circuit 516 is input as a gate control signal to the three-state buffer 516a. The ⁻Q output of the FF circuit 516 is input as a gate control signal to the three-state buffer 516b.

A signal output from the first reception amplifier 511 when the communication cable 7 is connected is input to the three-state buffer 516a. The three-state buffer 516a outputs the output signal of the first reception amplifier 511 to the identifying unit 57 in the subsequent stage when the Q output of the FF circuit 516 is ON. When the Q output is OFF, the output side comes into a high-impedance state.

A signal to be transmitted to the receiving/transmitting device 6 when the communication cable 8 is connected is input to the inverter 516c. The inverter 516c inverts the signal and outputs the signal to the three-state buffer 516b. The three-state buffer 516b outputs the signal input from the inverter 516c to the first transmission amplifier 512 when the ⁻Q output of the FF circuit 516 is ON. When the ⁻Q output is OFF, the output side comes into a high-impedance state.

The reversing circuit 52b in the second port 52 includes three-state buffers 526a and 526b, and an inverter 526c provided in the preceding stage of the three-state buffer 526b. The Q output of the FF circuit 526 is input as a gate control signal to the three-state buffer 526a. The ⁻Q output of the FF circuit 526 is input as a gate control signal to the three-state buffer 526b.

An output signal of the first differential receiver 520 is input to the three-state buffer 526a and the inverter 526c. Accordingly, when the Q output of the FF circuit 526 is ON, the output of the first differential receiver 520 is output from the three-state buffer 526a to the identifying unit 57 in the subsequent stage. When the ⁻Q output of the FF circuit 526 is ON, the output of the first differential receiver 520 is inverted by the inverter 526c, and is output from the three-state buffer 526b to the identifying unit 57 in the subsequent stage.

The reversing circuit 53b in the third port 53 is configured similarly to the reversing circuit 52b in the second port 52, and thus corresponding reference numerals are attached thereto and the description thereof is omitted.

The reversing circuit 54b in the fourth port 54 includes three-state buffers 546a and 546b, and an inverter 546c provided in the preceding stage of the three-state buffer 546a. The ⁻Q output of the FF circuit 546 is input as a gate control signal to the three-state buffer 546a. The Q output of the FF circuit 546 is input as a gate control signal to the three-state buffer 546b.

A signal to be transmitted to the receiving/transmitting device 6 when the communication cable 7 is connected is input to the three-state buffer 546b. Accordingly, the three-state buffer 546b outputs the signal to be transmitted to the receiving/transmitting device 6 to the second transmission amplifier 542 when the Q output of the FF circuit 546 is ON.

A signal output from the second reception amplifier 541 when the communication cable 8 is connected is input to the inverter 546c. The inverter 546c inverts the signal and outputs the signal to the three-state buffer 546a. The three-state buffer 546a outputs the output signal of the inverter 546c to the identifying unit 57 in the subsequent stage when the ⁻Q output of the FF circuit 546 is ON. When the ⁻Q output is OFF, the output side comes into a high-impedance state. The first to fourth signals S1 to S4 output from the respective reversing circuits 51b to 54b are input to the identifying unit 57.

Figure 6:
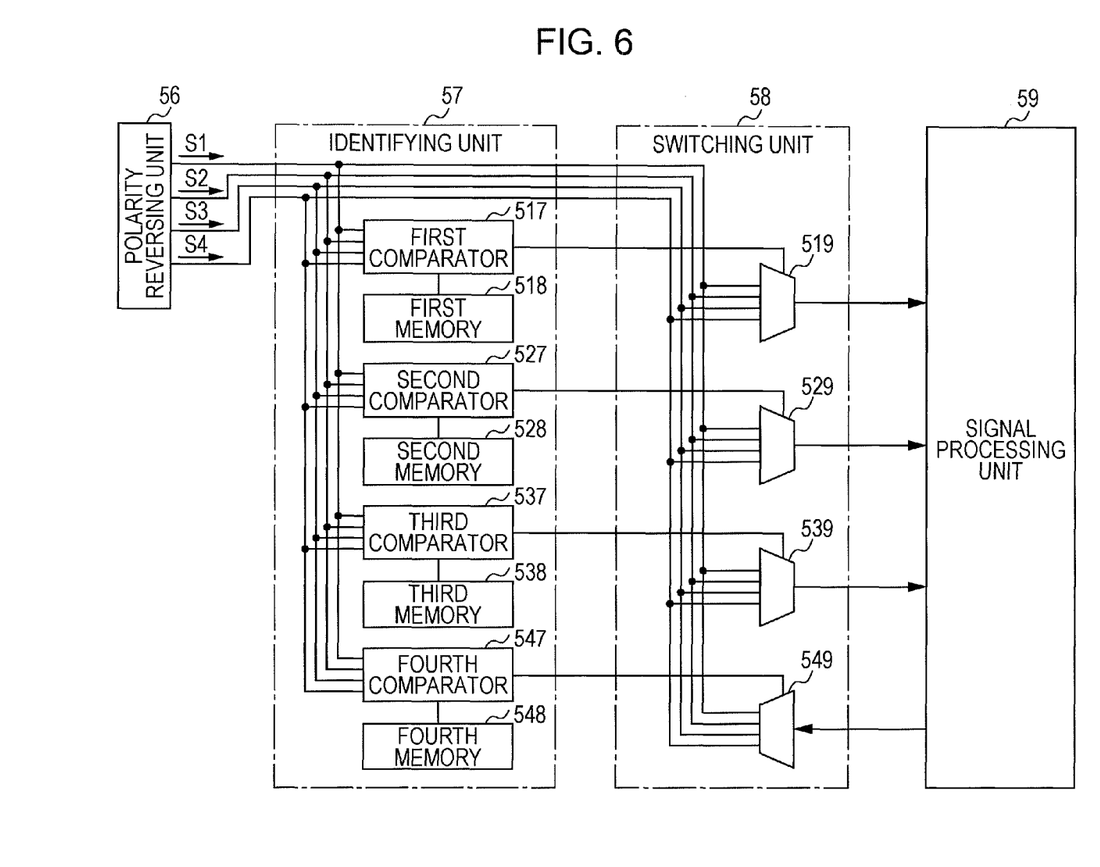
FIG. 6 is a schematic circuit diagram illustrating a specific example of configurations of an identifying unit and a switching unit according to the second exemplary embodiment of the present invention.

FIG. 6 is a schematic circuit diagram illustrating a specific example of configurations of the identifying unit 57 and the switching unit 58.

Each of signals received from the first to third ports 61 to 63 of the receiving/transmitting device 6 is input as any of the first to fourth signals S1 to S4 to the identifying unit 57 via the polarity determining unit 55 and the polarity reversing unit 56, which reverses the polarities of the signals if the signals have a reversed polarity. The identifying unit 57 identifies the ports of the receiving/transmitting device 6 to which the first to fourth ports 51 to 54 of the transmitting/receiving device 5 are connected on the basis of the signals transmitted from the first to third ports 61 to 63 of the receiving/transmitting device 6 at the time of initialization of the transmitting/receiving device 5.

The switching unit 58 changes the selection statuses of first to fourth selectors 519 to 549 on the basis of the identification result generated by the identifying unit 57, and performs switching by determining the ports for receiving signals from the first to third ports 61 to 63 of the receiving/transmitting device 6 among the first to fourth ports 51 to 54 of the transmitting/receiving device 5, and the port for transmitting a signal to the fourth port 64 of the receiving/transmitting device 6.

The identifying unit 57 includes first to fourth comparators 517, 527, 537 and 547, and first to fourth memories 518, 528, 538, and 548. The identifying unit 57 identifies the connection statuses of the first to fourth ports 51 to 54 on the basis of pieces of identification data of a predetermined bit length (for example, eight bits) having different contents transmitted from the first to third ports 61 to 63 of the receiving/transmitting device 6 at the initialization of the transmitting/receiving device 5.

The first memory 518 stores verification data having the same content as the identification data transmitted from the first port 61 of the receiving/transmitting device 6. The second memory 528 stores verification data having the same content as the identification data transmitted from the second port 62 of the receiving/transmitting device 6. The third memory 538 stores verification data having the same content as the identification data transmitted from the third port 63 of the receiving/transmitting device 6. The fourth memory 548 stores verification data in which all the bits are zero indicating that no identification data has been received from the receiving/transmitting device 6.

The first comparator 517 determines which of the signals including the first signal S1 output from the reversing circuit 51b of the polarity reversing unit 56, the second signal S2 output from the reversing circuit 52b, the third signal S3 output from the reversing circuit 53b, and the fourth signal S4 output from the reversing circuit 54b matches the verification data stored in the first memory 518.

Likewise, the second comparator 527 determines which of the first to fourth signals S1 to S4 matches the verification data stored in the second memory 528. The third comparator 537 determines which of the first to fourth signals S1 to S4 matches the verification data stored in the third memory 538. The fourth comparator 547 determines which of the first to fourth signals S1 to S4 matches the verification data stored in the fourth memory 548.

The first comparator 517 outputs a first selection signal to the first selector 519 of the switching unit 58 so that the signal that matches the verification data stored in the first memory 518 among the first to fourth signals S1 to S4 is output from the first selector 519. The second comparator 527 outputs a second selection signal to the second selector 529 of the switching unit 58 so that the signal that matches the verification data stored in the second memory 528 among the first to fourth signals S1 to S4 is output from the second selector 529. The third comparator 537 outputs a third selection signal to the third selector 539 of the switching unit 58 so that the signal that matches the verification data stored in the third memory 538 among the first to fourth signals S1 to S4 is output from the third selector 539.

The fourth comparator 547 outputs a fourth selection signal to the fourth selector 549 so that the signal from the signal processing unit 59 is output to the port corresponding to the signal that matches the verification data stored in the fourth memory 548 among the first to fourth signals S1 to S4. That is, the fourth comparator 547 switches the selection status of the fourth selector 549 so that a signal is transmitted to the fourth port 64 of the receiving/transmitting device 6 from the port that does not receive the signal of identification data from the receiving/transmitting device 6 among the first to fourth ports 51 to 54 of the transmitting/receiving device 5. The first to fourth selection signals represent the identification results generated by the identifying unit 57.

The signal processing unit 59 is constituted by a hardware device such as an ASIC, a CPU that operates in accordance with a program stored in advance, or the like, executes predetermined processing on the basis of the signals output from the first to third selectors 519 to 539 (signals transmitted from the first to third ports 61 to 63 of the receiving/transmitting device 6), and outputs a signal that is to be transmitted to the receiving/transmitting device 6 to the fourth selector 549. The signal processing unit 59 temporarily stores information about a signal received from the receiving/transmitting device 6 and transfers the signal to another device, or receives, from another device, information that is to be transferred to the receiving/transmitting device 6, temporarily stores the information, and outputs the information one bit by one bit.

Operation of Signal Transmitting Apparatus

The signal transmitting apparatus 100 having the above-described configuration operates in the following manner.

After the power of the signal transmitting apparatus 100 has been turned on, the signal processing unit 65 of the receiving/transmitting device 6 outputs, to the first to third differential amplifiers 610 to 630 of the first to third ports 61 to 63, a signal representing polarity determination data for determining a polarity and a signal representing identification data for identifying the ports in this order. The first to third differential amplifiers 610 to 630 transmit these signals to the transmitting/receiving device 5 via the communication cable 7 or the communication cable 8.

In a case where the transmitting/receiving device 5 and the receiving/transmitting device 6 are connected to each other via the communication cable 7 (straight cable), the first reception amplifier 511, the first differential receiver 520, and the second differential receiver 530 of the transmitting/receiving device 5 receive signals from the first to third ports 61 to 63 of the receiving/transmitting device 6. The received signals are output to the polarity determining unit 55, and the polarities of the signals are determined there. In the configuration according to this exemplary embodiment, the polarity of a signal received from the receiving/transmitting device 6 is not reversed when the communication cable 7 is used, as described above, and thus reversing of the polarity by the polarity reversing unit 56 is not performed here.

On the other hand, in a case where the transmitting/receiving device 5 and the receiving/transmitting device 6 are connected to each other via the communication cable 8 (cross cable), the second reception amplifier 541, the first differential receiver 520, and the second differential receiver 530 of the transmitting/receiving device 5 receive signals from the first to third ports 61 to 63 of the receiving/transmitting device 6. The received signals are output to the polarity determining unit 55, and the polarities of the signals are determined there. In the configuration according to this exemplary embodiment, the polarity of a signal received from the receiving/transmitting device 6 is reversed when the communication cable 8 is used, as described above, and thus the polarity reversing unit 56 reverses the polarities of the received signals on the basis of the determination result generated by the polarity determining unit 55.

The first to fourth signals S1 to S4 output from the polarity reversing unit 56 are input to the identifying unit 57. The identifying unit 57 identifies, on the basis of the identification data supplied from the receiving/transmitting device 6, the ports of the receiving/transmitting device 6 to which the first to fourth ports of the transmitting/receiving device 5 are connected, and outputs selection signals serving as identification results to the first to fourth selectors 519 to 549 of the switching unit 58. Accordingly, bidirectional communication between the transmitting/receiving device 5 and the receiving/transmitting device 6 is realized.

Third Exemplary Embodiment

Next, a third exemplary embodiment of the present invention will be described. In the second exemplary embodiment, the individual functions of the polarity determining unit 55, the polarity reversing unit 56, the identifying unit 57, and the switching unit 58 are realized by hardware units. In the third exemplary embodiment, the functions of these units are realized by a CPU that operates in accordance with a program stored in advance in a storage device, such as a read only memory (ROM). That is, in the third exemplary embodiment, the CPU functions as the polarity determining unit 55, the polarity reversing unit 56, the identifying unit 57, and the switching unit 58.

In this case, the CPU determines the polarities of signals received from the receiving/transmitting device 6 by the first reception amplifier 511 or the second reception amplifier 541, the second differential receiver 520, and the third differential receiver 530. If the determination result is "reversed polarity", the CPU stores the determination result, and logically reverses the polarity of a signal received thereafter.

Also, the CPU identifies, on the basis of the content of identification data received from the receiving/transmitting device 6, the ports among the first to fourth ports 61 to 64 of the receiving/transmitting device 6 to which the first to fourth ports 51 to 54 of the transmitting/receiving device 5 are connected, and stores information about the identification result. On the basis of the identification result, the ports connected to the first to third ports 61 to 63 serving as transmission ports of the receiving/transmitting device 6 among the first to fourth ports 51 to 54 receive signals from the receiving/transmitting device 6, and the port connected to the fourth port 64 serving as a reception port of the receiving/transmitting device 6 transmits a signal to the receiving/transmitting device 6.

Other Exemplary Embodiments

The present invention is not limited to the above-described exemplary embodiments, and various modifications may be made without changing the gist of the invention.

For example, in the second exemplary embodiment, the polarities of signals received from the receiving/transmitting device 6 are determined on the basis of the signals, and then the connection statuses of the individual ports are identified. Alternatively, it may be determined that a cross cable is connected when the signals received from the receiving/transmitting device 6 have reversed polarities, and communication may be performed on the basis of the connection statuses of the ports that are preset in accordance with the wiring of the cross cable. For example, in a case where the communication cable 8 serving as a cross cable is connected, the first port 61 of the receiving/transmitting device 6 is connected to the fourth port 54 of the transmitting/receiving device 5, the second port 62 of the receiving/transmitting device 6 is connected to the third port 53 of the transmitting/receiving device 5, the third port 63 of the receiving/transmitting device 6 is connected to the second port 52 of the transmitting/receiving device 5, and the fourth port 64 of the receiving/transmitting device 6 is connected to the first port 51 of the transmitting/ receiving device 5. Accordingly, the polarity determining unit 55 and the switching unit 58 may be configured so that the first to fourth selectors 519 to 549 may switch the connection status to this connection status when signals received from the receiving/transmitting device 6 have reversed polarities. When the transmitting/receiving device 5 is configured in this way, the identifying unit 57 may be omitted.

In the second exemplary embodiment, the communication cable 8 is configured so that the connections of all the signal lines are reversed between the first connector unit 8B and the second connector unit 8C. Alternatively, the communication cable 8 may be configured so that the connections of some of the signal lines are reversed. For example, the first terminal 86a of the first connector unit 8B may be connected to the eighth terminal 87h of the second connector unit 8C, the second terminal 86b of the first connector unit 8B may be connected to the seventh terminal 87g of the second connector unit 8C, the seventh terminal 86g of the first connector unit 8B may be connected to the second terminal 87b of the second connector unit 8C, and the eighth terminal 86h of the first connector unit 8B may be connected to the first terminal 87a of the second connector unit 8C, and the other terminals may be connected in the same manner as in the communication cable 7 serving as a straight cable.

Also, the number of ports of the transmitting/receiving device 5 and the receiving/transmitting device 6, and the content of data represented by signals transmitted/received between both the devices are not particularly limited.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transmitting/receiving device comprising:
a transmitting/receiving unit that is connected to a transmission side or a reception side via a differential signal line including a pair of signal lines, that receives a signal using one of the pair of signal lines when being connected to the transmission side, and that transmits a signal using the other of the pair of signal lines when being connected to the reception side; and
a signal processing unit that processes a signal that is transmitted or received by the transmitting/receiving unit.

2. The transmitting/receiving device according to claim 1, further comprising:
a polarity determining unit that determines, on the basis of a signal received from the transmission side, a polarity of a signal transmitted from the transmission side; and
a polarity reversing unit that reverses, when the polarity of the signal determined by the polarity determining unit is a reversed polarity, the polarity of the signal received from the transmission side.

3. The transmitting/receiving device according to claim 2, further comprising:
a switching unit that performs switching by determining, on the basis of a signal received from the transmission side, which of the first and second transmitting/receiving units is to be used for performing transmission to the reception side and which of the first and second transmitting/receiving units is to be used for performing reception from the transmission side.

4. A transmitting/receiving device comprising:
a first transmitting/receiving unit that is connected to one of a reception side and a transmission side via a first differential signal line including a pair of signal lines;
a second transmitting/receiving unit that is connected to the other of the reception side and the transmission side via a second differential signal line including another pair of signal lines; and
a signal processing unit that processes a signal that is transmitted or received by the first transmitting/receiving unit or the second transmitting/receiving unit,
wherein the first transmitting/receiving unit and the second transmitting/receiving unit transmit a signal using one of the pair of signal lines when being connected to the reception side, and receive a signal using the other of the pair of signal lines when being connected to the transmission side.

5. The transmitting/receiving device according to claim 4, further comprising:
a polarity determining unit that determines, on the basis of a signal received from the transmission side, a polarity of a signal transmitted from the transmission side; and
a polarity reversing unit that reverses, when the polarity of the signal determined by the polarity determining unit is a reversed polarity, the polarity of the signal received from the transmission side.

6. The transmitting/receiving device according to claim 4, further comprising:
a switching unit that performs switching by determining, on the basis of a signal received from the transmission side, which of the first and second transmitting/receiving units is to be used for performing transmission to the reception side and which of the first and second transmitting/receiving units is to be used for performing reception from the transmission side.

7. The transmitting/receiving device according to claim 5, further comprising:
a switching unit that performs switching by determining, on the basis of a signal received from the transmission side, which of the first and second transmitting/receiving units is to be used for performing transmission to the reception side and which of the first and second transmitting/receiving units is to be used for performing reception from the transmission side.

8. A signal transmitting apparatus comprising:
the transmitting/receiving device according to claim 4; and
a receiving/transmitting device that includes a differential receiver on the reception side, the differential receiver receiving a signal from one of the first differential signal line and the second differential signal line, and a differential amplifier on the transmission side, the differential amplifier outputting a differential signal to the other of the first differential signal line and the second differential signal line.

* * * * *